United States Patent [19]

Toyoguchi

[11] Patent Number: 5,147,738
[45] Date of Patent: Sep. 15, 1992

[54] NONAQUEOUS ELECTROLYTE SECONDARY BATTERY

[75] Inventor: Yoshinori Toyoguchi, Yao, Japan

[73] Assignee: Matsushita Electric Industrial Co., Ltd., Japan

[21] Appl. No.: 592,488

[22] Filed: Oct. 4, 1990

[30] Foreign Application Priority Data

Oct. 6, 1989 [JP] Japan .................. 1-262430

[51] Int. Cl.$^5$ .................. H01M 4/52
[52] U.S. Cl. .................. 429/194; 429/218
[58] Field of Search .................. 429/194, 218

[56] References Cited

U.S. PATENT DOCUMENTS

| | | |
|---|---|---|
| 4,366,215 | 12/1982 | Coetzer et al. .................. 429/218 X |
| 4,369,105 | 1/1983 | Caldwell et al. .................. 429/218 X |
| 4,542,083 | 9/1985 | Cava et al. .................. 429/194 X |
| 4,567,031 | 1/1986 | Riley . | |

FOREIGN PATENT DOCUMENTS 0017400 10/1980 European Pat. Off. .
0243926 11/1987 European Pat. Off. .
63-210028 8/1988 Japan .
1-294358 11/1989 Japan .

OTHER PUBLICATIONS

Matsumoto et al, *Chemical Abstracts*, vol. 110, No. 79372u, Mar. 1989.
Chemical Abstracts, vol. 112, No. 18, Apr. 30, 1990, p. 235, Abstract No. 162253t, Columbus, Ohio, USA; & JP-A-1-294,358, Nov. 1989, Abstract.

*Primary Examiner*—Stephen Kalafut

[57] ABSTRACT

A nonaqueous electrolyte secondary battery is constituted of an anode made of lithium or lithium compound, a nonaqueous electrolyte containing lithium compound, and a cathode active material. The cathode active material is represented by expression $Li_xCo_{(1-Y)}M_YO_2$ ($0.85 \leq X \leq 1.3$, $0.05 \leq Y \leq 0.35$, wherein M is a metal of at least one of W, Mn, Ta, Ti, Nb). The battery using the cathode active material of the present invention is improved in discharge capacity deterioration rate based on cycle and discharge capacity.

9 Claims, 3 Drawing Sheets

NONAQUEOUS ELECTROLYTE SECONDARY BATTERY

FIELD OF THE INVENTION AND RELATED ART STATEMENT

1. Field of the Invention

The present invention relates to an improvement of nonaqueous electrolyte secondary batteries, and particularly to an improvement of cathode active material.

2. Description of the Related Art

Nonaqueous electrolyte secondary batteries using lithium or lithium compound as an anode are expected to have high voltage and high energy density, and therefore, many researches have been made. Especially, $MnO_2$ and $TiS_2$ are investigated for use for cathode active material of those batteries. Recently, Mizushima et al. reported that $LiCoO_2$ can be used as the cathode active material (Material Research Bulletin Vol. 15, pp. 783-789, 1980).

$LiCoO_2$ has a hexagonal crystal lattice. In case that $LiCoO_2$ is used as the cathode active material of battery, the battery shows an one-stage discharge curve when it is charged up to 4.5 volt and discharged continuously to 2 volt. Discharge voltage of the battery is relatively high as about 4 volt, and therefore, it is considered that $LiCoO_2$ is promising for the cathode active material. When the battery using $LiCoO_2$ is being charged, Li come out from $LiCoO_2$ crystal and enter into electrolyte as $Li^+$ —ion. Therefore, the cathode active material during the charging state can be represented by "$Li_xCoO_2$, wherein x decreases from 1 toward 0, namely $0<x<1$". On the contrary, when the battery is being discharged, a reaction which is reverse to that of the charging takes place, and $Li^+$ —ions in the electrolyte come out and enter into the $LiCoO_2$ crystal.

However, there is a problem in cycle life of the cathode active material in the non-aqueous electrolyte secondary battery using $LiCoO_2$ as cathode active material. That is, when charge-discharge cycle is repeated, the discharge capacity remarkably deteriorates.

OBJECT AND SUMMARY OF THE INVENTION

The object of the present invention is to improve cycle life of nonaqueous electrolyte secondary battery using $LiCoO_2$ as cathode active material by improving the cathode active material.

This object is accomplished by a nonaqueous electrolyte secondary battery which comprises:
an anode containing lithium as lithium compound,
a nonaqueous electrolyte containing lithium compound, and,
a cathode having a cathode active material represented by expression:

$$Li_xCo_{(1-y)}M_yO_2$$

wherein X and Y are defined as follows:
$0.85 \leq X \leq 1.3$, $0.05 \leq Y \leq 0.35$, wherein M is a metal of at least one member selected from the group consisting of W, Mn, Ta, Ti and Nb.

$LiCoO_2$ has hexagonal crystal lattice and on charging $Li^+$ —ions come out from the crystal and on discharging enters into the crystal. The inventors conceived that improvement of the cycle life of the battery is made by replacing a part of Co by other metal to stabilize the crystal and using this crystal as the cathode active material. Then, the inventors made various experiments with respect to various metals and found that W, Mn, Ta, Ti and Nb are effective as the metals to replace Co. By observing $LiCoO_2$ wherein a part of Co is replaced by other metal by a X ray diffraction microscopy, it is found that lattice constant becomes small hexagonal. The observed lattice constants of $LiCoO_2$ are: $a_0=0.2812$ nm, $C_0=1.4051$ nm, and the observed lattice constants of $LiCo_{0.9}Mn_{0.1}O_2$ is as follows: $a_0=0.2803$ nm, $C_0=1.4006$ nm. These results would correspond to improvement of the cycle life.

As mentioned above, the cycle life of battery is improved by using material represented by the expression $Li_xCo_{(1-y)}M_yO_2$ ($0.85 \leq X \leq 1.3$, $0.05 \leq Y \leq 0.35$, M=W, Mn, Ta, Ti, Nb) as the cathode active material of battery.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

EXAMPLE 1

Preparation of $LiCoO_2$ (comparison EXAMPLE 1)

$LiCoO_2$ is prepared by mixing $Li_2CO_3$ and $CoCO_3$ at ratio of 1 mole $Li_2CO_3$: 2 mole $CoCO_3$, followed by heating the mixture at 900° C. for 10 hours.

Preparation of $Li_xCo_{(1-y)}M_yO_2$ (M=W, Mn, Ta, Ti, Nb)

$Li_xCo_{(1-y)}M_yO_2$ is prepared by mixing $Li_2CO_3$, $CoCO_3$ and at least one oxide of W, Mn, Ta, Ti, Nb at predetermined ratio (Li atom=X mole, Co atom=1−Y mole, M atom=Y mole), followed by heating the mixture at 900° C. for 10 hours.

Figure 2:
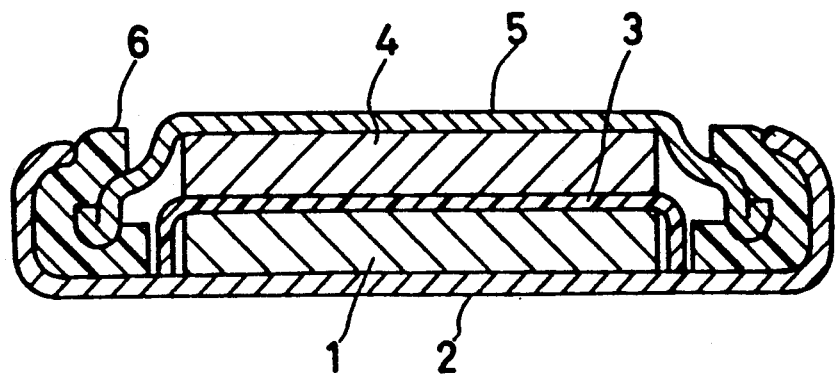
FIG. 2 is a vertical sectional view showing a battery used in experiments.

Fabrication of Battery 7 parts by weight of $LiCoO_2$, or $Li_xCo_{(1-y)}M_yO_2$ as cathode active material, 2 parts by weight of acetylene black as conductive material and 1 parts by weight of polytetrafluoroethylen resin as binding agent are mixed, thereby making mixed cathode material. Then, 0.1 g of the mixed cathode material is put into a mold having 17.5 mm of diameter and pressed at 1 ton/cm² to form disk-shaped cathode. Next, explanation is made on constitution of a battery using the cathode made by the above-mentioned method, with reference to FIG. 2. A cathode 1 is put on a case 2. A separator 3 made of porous polypropylene film is put on the cathode 1. Lithium plate 4 as an anode having 17.5 mm of diameter and 0.3 mm of thickness is put on the separator 3. A sealing plate 5 with gasket (made of polypropylene) 6 is pressed to upper surface of the lithium plate 4. Nonaqueous electrolyte is made by dissolving lithium perchlorate at a concentration of 1 mol/l in 1:1 (by volume)-mixed solution of propylene carbonate/dimetoxyethane. The nonaqueous electrolyte is provided on the separator 3 and the anode 4, and thereafter, the battery is sealed.

Figure 1:
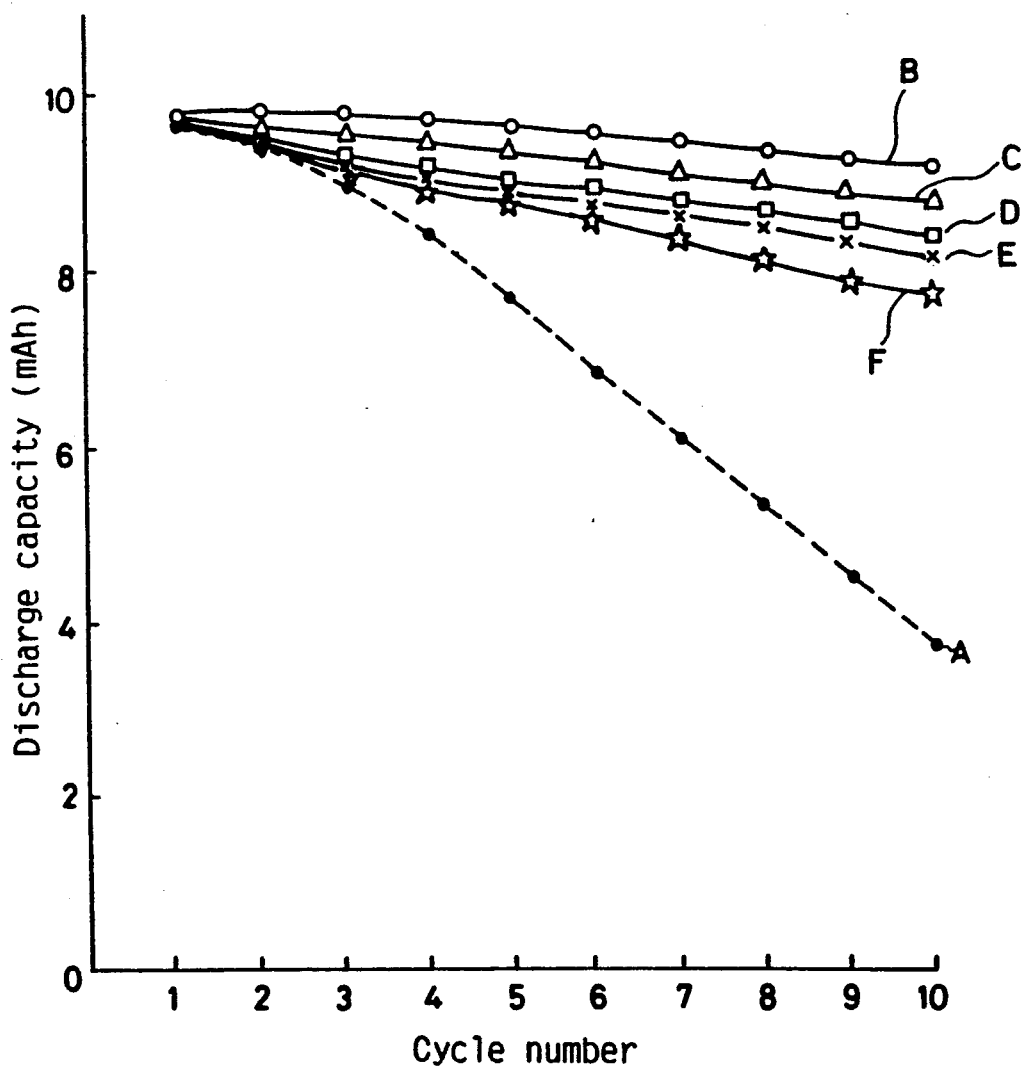
FIG. 1 is a characteristic diagram showing discharge capacity at each cycle of batteries embodying the present invention and the conventional battery (comparison example 1).

Batteries prepared by the above-mentioned method are charged to 4.5 volt and discharged to 2 volt at a constant current of 2 mA and cycle of the charge and the discharge is repeated. FIG. 1 shows relation of cycle number and discharge capacity of the batteries wherein $LiCo_{0.9}M_{0.1}O_2$ prepared by replacing 10% of Co by other metal and $LiCoO_2$ (comparison example 1) are used as the cathode active material. In FIG. 1 a curve A shows comparison example 1 of $LiCoO_2$, and respective curves B, C, D, E and F show the cathode active material of the present invention, wherein compositions $LiCoO_{0.9}M_{0.1}O_2$ prepared by replacing 10% of Co in $LiCoO_2$ by W, Mn, Ta, Ti and Nb, respectively are used as the cathode active materials. According to FIG. 1, it is understood that the cycle life is improved by replacing a part of Co in $LiCoCO_2$ by W, Mn, Ta, Ti, Nb.

In order to represent state of the cycle life numerically, a value given by the following expression is used as the discharge capacity deterioration rate R based on cycle:

$$R = \frac{P - Q}{P}$$

wherein
P: discharge capacity at the second cycle
Q: discharge capacity at the tenth cycle.
It is to be understood that the smaller the value R of the deterioration rate is, the better the cycle life is.

Figure 3:
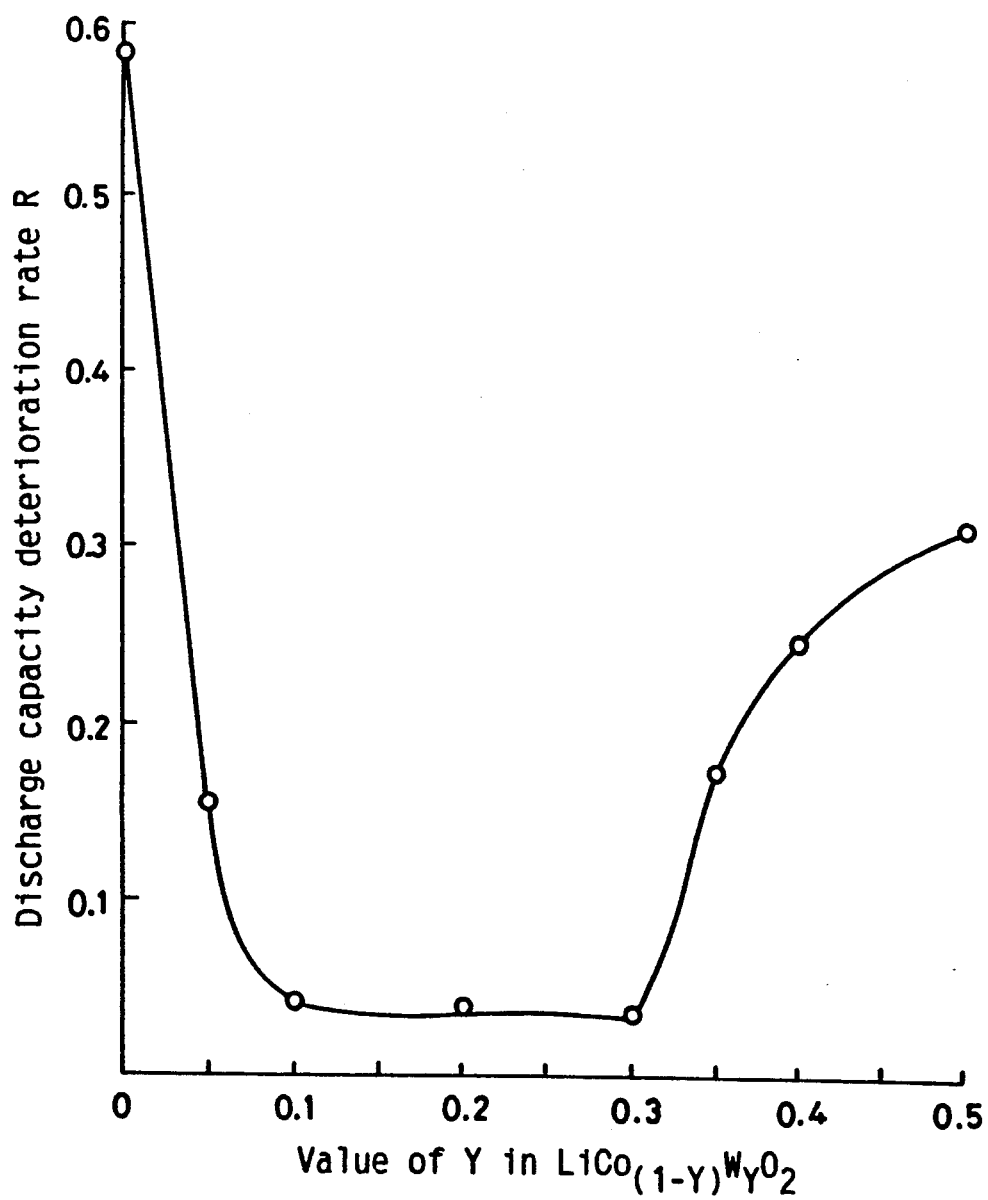
FIG. 3 is a diagram showing a relation of discharge capacity deterioration rate with value of Y in $LiCo_{(1-y)}M_yO_2$.

FIG. 3 shows relation of the discourage capacity deterioration rate and value of Y in the expression $LiCo_{(1-\eta)}W_yO_2$. That is, in the above-mentioned expression, a part of Co in $LiCoO_2$ is replaced by W, and the replacing ratio is shown by Y. As shown in FIG. 3, in compositional range $0.05 \leq Y \leq 0.35$, the cycle life was good. However, when Y is more than 0.35, X ray diffraction pattern of the cathode active material showed remarkably different peaks to $LiCoO_2$ and the cycle life also deteriorates. Similar results were also obtained by using Mn, Ta, Ti and Nb in the place of W.

Then, the cycle life was examined as to compositions $Li_xCo_{0.9}Mn_{0.1}O_2$ wherein a part of Co was replaced by Mn, and Li amount was also changed.

Figure 4:
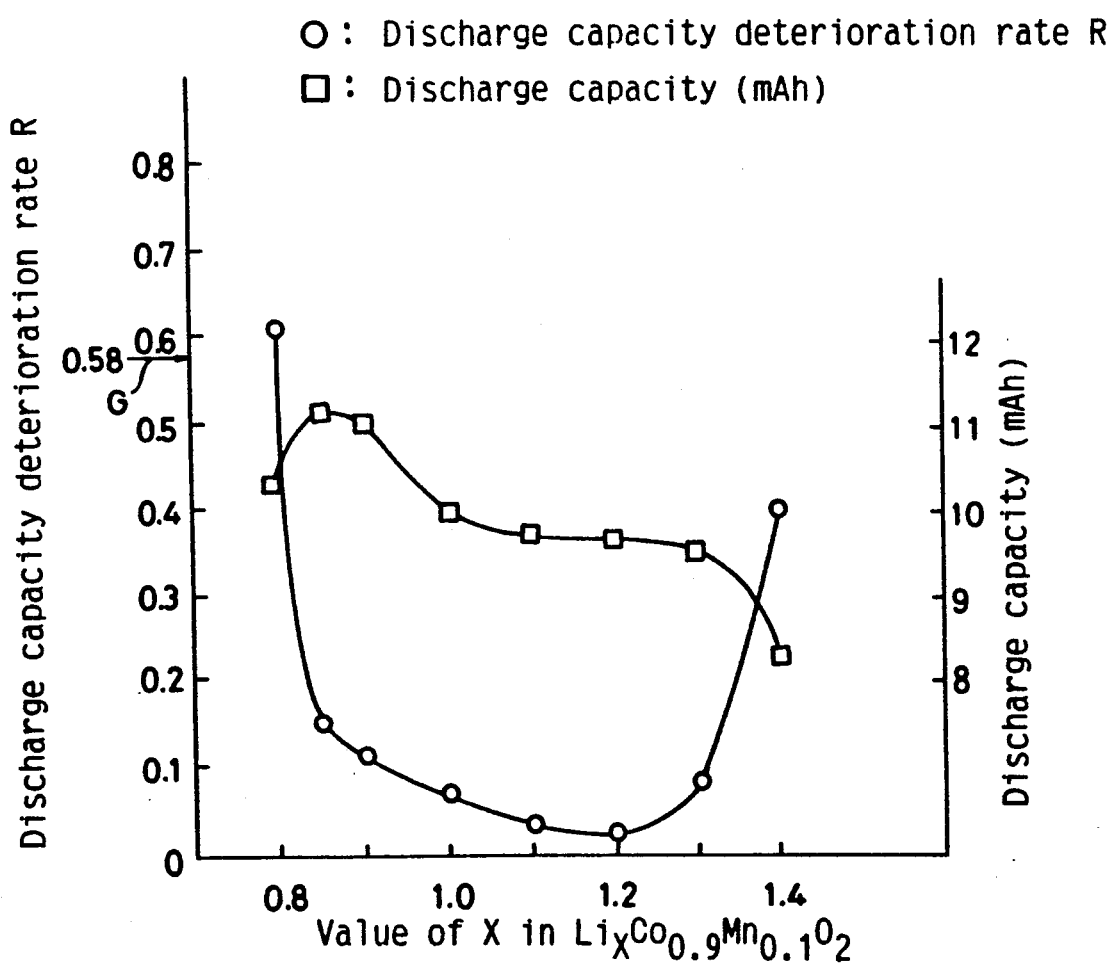
FIG. 4 is a diagram showing a relation of discharge capacity deterioration rate with value of X in $Li_xCo_{0.9}Mn_{0.1}O_2$ and a relation of discharge capacity at the first cycle as a battery with value of X in $Li_xCo_{0.9}Mn_{0.1}O_2$.

FIG. 4 shows a relation between discharge capacity at the first cycle and the discharge capacity deterioration rate R based on cycle to value X in the above-mentioned expression $Li_xCo_{0.9}Mn_{0.1}O_2$. In FIG. 4, an arrow G shows "0.58" which is the value of the discharge capacity deterioration rate R of $LiCoO_2$, which is comparison example 1 as the conventional cathode active material. From FIG. 4, in the compositional ranges $X < 0.85$ and $X > 1.3$, it is shown that influence of replacing a part of Co by Mn was small. And in the compositional range $0.85 \leq X \leq 1.3$, it is shown that effect of replacing a part of Co by Mn was significant. That is, the cycle life is improved remarkably.

Further in the compositional range $0.85 \leq X < 1$, a unique effect is shown in addition to improved cycle life. That is, the discharge capacity at the first cycle which is the discharge capacity before causing discharge capacity deterioration, was increased than value of the discharge capacity in the range $X \geq 1$.

The inventors examined numerous kinds of metals M in replacing a part of Co instead of above-mentioned Mn. And they found that some metal e.g. W, Ta, Ti, Nb show improved cycle life similarly to Mn. Furthermore, as to each metal M (including Mn) showing improved cycle life, in order to obtain suitable amount of M and Li, the discharge capacity deterioration rate R is measured as the amount of M and Li are changed respectively. That is, the discharge capacity deterioration rate R of a cathode active material which is expressed by the formula $Li_xCo_{(1-y)}M_yO_2$ is measured for various values X and Y.

The following Table 1 shows the discharge capacity deterioration rate R of $Li_xCo_{(1-y)}M_yO_2$ (in case M is W(tungsten)).

TABLE 1

| The value of Y in $Li_xCo_{(1-y)}W_yO_2$ | The value of X in $Li_xCo_{(1-y)}W_yO_2$ | | | | | | |
|---|---|---|---|---|---|---|---|
| | 0.8 | 0.85 | 0.9 | 1.0 | 1.2 | 1.3 | 1.4 |
| 0 | 0.74 | 0.65 | 0.64 | 0.58 | 0.41 | 0.53 | 0.63 |
| 0.02 | 0.37 | 0.34 | 0.32 | 0.30 | 0.22 | 0.30 | 0.33 |
| 0.05 | 0.22 | 0.17 | 0.16 | 0.16 | 0.12 | 0.16 | 0.24 |
| 0.1 | 0.21 | 0.07 | 0.05 | 0.04 | 0.04 | 0.07 | 0.24 |
| 0.2 | 0.21 | 0.06 | 0.05 | 0.04 | 0.04 | 0.10 | 0.25 |
| 0.3 | 0.25 | 0.09 | 0.06 | 0.04 | 0.04 | 0.17 | 0.30 |
| 0.35 | 0.31 | 0.20 | 0.19 | 0.18 | 0.18 | 0.19 | 0.33 |
| 0.4 | 0.39 | 0.32 | 0.30 | 0.25 | 0.22 | 0.23 | 0.38 |

The following Table 2 shows the discharge capacity deterioration rate R of $Li_xCo_{(1-y)}M_yO_2$ (in case M is Mn(manganese)).

TABLE 2

| The value of X in $Li_xCo_{(1-y)}Mn_yO_2$ | The value of Y in $Li_xCo_{(1-y)}Mn_yO_2$ | | | | | | |
|---|---|---|---|---|---|---|---|
| | 0.8 | 0.85 | 0.9 | 1.0 | 1.2 | 1.3 | 1.4 |
| 0 | 0.74 | 0.65 | 0.64 | 0.58 | 0.41 | 0.53 | 0.63 |
| 0.02 | 0.70 | 0.30 | 0.31 | 0.30 | 0.24 | 0.28 | 0.51 |
| 0.05 | 0.65 | 0.18 | 0.16 | 0.14 | 0.10 | 0.12 | 0.45 |
| 0.1 | 0.61 | 0.15 | 0.11 | 0.08 | 0.02 | 0.08 | 0.40 |
| 0.2 | 0.56 | 0.14 | 0.11 | 0.06 | 0.04 | 0.08 | 0.40 |
| 0.3 | 0.61 | 0.17 | 0.12 | 0.09 | 0.06 | 0.09 | 0.43 |
| 0.35 | 0.65 | 0.19 | 0.15 | 0.13 | 0.11 | 0.14 | 0.44 |
| 0.4 | 0.70 | 0.35 | 0.26 | 0.23 | 0.21 | 0.24 | 0.49 |

The following Table 3 shows the discharge capacity deterioration rate R of $Li_xCo_{(1-y)}M_yO_2$ (in case M is Ta(tantalum)).

TABLE 3

| The value of Y in $Li_xCo_{(1-y)}Ta_yO_2$ | The value of X in $Li_xCo_{(1-y)}Ta_yO_2$ | | | | | | |
|---|---|---|---|---|---|---|---|
| | 0.8 | 0.85 | 0.9 | 1.0 | 1.2 | 1.3 | 1.4 |
| 0 | 0.74 | 0.65 | 0.64 | 0.58 | 0.41 | 0.53 | 0.63 |
| 0.02 | 0.61 | 0.37 | 0.35 | 0.30 | 0.23 | 0.26 | 0.52 |
| 0.05 | 0.55 | 0.18 | 0.15 | 0.12 | 0.11 | 0.12 | 0.35 |
| 0.1 | 0.40 | 0.14 | 0.12 | 0.10 | 0.08 | 0.09 | 0.40 |
| 0.2 | 0.36 | 0.11 | 0.11 | 0.08 | 0.07 | 0.09 | 0.33 |
| 0.3 | 0.36 | 0.16 | 0.13 | 0.09 | 0.08 | 0.10 | 0.39 |
| 0.35 | 0.43 | 0.19 | 0.17 | 0.12 | 0.11 | 0.13 | 0.42 |

TABLE 3-continued

| The value of Y in $Li_xCo_{(1-y)}Ta_yO_2$ | The value of X in $Li_xCo_{(1-y)}Ta_yO_2$ | | | | | | |
|---|---|---|---|---|---|---|---|
| | 0.8 | 0.85 | 0.9 | 1.0 | 1.2 | 1.3 | 1.4 |
| 0.4 | 0.52 | 0.29 | 0.24 | 0.23 | 0.22 | 0.24 | 0.45 |

The following Table 4 shows the discharge capacity deterioration rate R of $Li_xCo_{(1-y)}M_yO_2$ (in case M is Ti(titanium)).

TABLE 4

| The value of Y in $Li_xCo_{(1-y)}Ti_yO_2$ | The value of X in $Li_xCo_{(1-y)}Ti_yO_2$ | | | | | | |
|---|---|---|---|---|---|---|---|
| | 0.8 | 0.85 | 0.9 | 1.0 | 1.2 | 1.3 | 1.4 |
| 0 | 0.74 | 0.65 | 0.64 | 0.58 | 0.41 | 0.53 | 0.63 |
| 0.02 | 0.62 | 0.41 | 0.40 | 0.38 | 0.27 | 0.25 | 0.50 |
| 0.05 | 0.51 | 0.19 | 0.18 | 0.17 | 0.14 | 0.13 | 0.39 |
| 0.1 | 0.41 | 0.15 | 0.15 | 0.14 | 0.10 | 0.10 | 0.34 |
| 0.2 | 0.36 | 0.12 | 0.10 | 0.09 | 0.08 | 0.09 | 0.34 |
| 0.3 | 0.39 | 0.12 | 0.10 | 0.10 | 0.09 | 0.10 | 0.36 |
| 0.35 | 0.42 | 0.17 | 0.15 | 0.15 | 0.13 | 0.16 | 0.39 |
| 0.4 | 0.46 | 0.32 | 0.30 | 0.29 | 0.29 | 0.34 | 0.41 |

The following Table 5 shows the discharge capacity deterioration rate R of $Li_xCo_{(1-y)}M_yO_2$ (in case M is Nb(niobium)).

TABLE 5

| The value of X in $Li_xCo_{(1-y)}Nb_yO_2$ | The value of Y in $Li_xCo_{(1-y)}Nb_yO_2$ | | | | | | |
|---|---|---|---|---|---|---|---|
| | 0.8 | 0.85 | 0.9 | 1.0 | 1.2 | 1.3 | 1.4 |
| 0 | 0.74 | 0.65 | 0.64 | 0.58 | 0.41 | 0.53 | 0.63 |
| 0.02 | 0.37 | 0.36 | 0.35 | 0.40 | 0.31 | 0.33 | 0.52 |
| 0.05 | 0.29 | 0.19 | 0.19 | 0.18 | 0.17 | 0.19 | 0.40 |
| 0.1 | 0.28 | 0.19 | 0.19 | 0.18 | 0.16 | 0.18 | 0.36 |
| 0.2 | 0.28 | 0.16 | 0.10 | 0.10 | 0.09 | 0.10 | 0.36 |
| 0.3 | 0.27 | 0.15 | 0.10 | 0.10 | 0.08 | 0.09 | 0.40 |
| 0.35 | 0.35 | 0.19 | 0.16 | 0.14 | 0.12 | 0.14 | 0.42 |
| 0.4 | 0.42 | 0.40 | 0.36 | 0.31 | 0.29 | 0.29 | 0.43 |

From Tables 1 to 5, it is observed that in the compositional range of $0.85 \leq X \leq 1.3$ and $0.05 \leq Y \leq 0.35$, the value of the discharge capacity deterioration rate R of respective metal was 0.2 or bellow, and was rather better (smaller) than 0.58 which is the value of the discharge capacity deterioration rate of LiCoO₂ (comparison example 1 as the conventional cathode active material).

Further, from Table 1 (in case M is W), it is observed that in the compositional range of $0.85 \leq X \leq 1.3$ and $0.1 \leq Y \leq 0.3$ (which excludes the point of X=1.3 and Y=0.3), the value of the discharge capacity deterioration rate R is 0.1 or below, and is better (smaller) than 0.2. That is, better cycle life was obtained.

From Table 2 and 3 (in case M is Mn or Ta), it is observed that in the compositional range of $1.0 \leq X \leq 1.3$ and $0.1 \leq Y \leq 0.3$, the value of the discharge capacity deterioration rate R was 0.1 or below. That is, better cycle life was obtained.

From Table 4 (in case M is Ti), it is observed that in the compositional range of $0.9 \leq X \leq 1.3$ and $0.1 \leq Y \leq 0.3$ (which excludes the range of $0.9 \leq X \leq 1.0$ and Y=0.1), the value of the discharge capacity deterioration rate R was 0.1 or below. That is, better cycle life was obtained.

From Table 5 (in case M is Nb), it is observed that in the compositional range of $0.9 \leq X \leq 1.3$ and $0.2 \leq Y \leq 0.3$, the value of the discharge capacity deterioration rate R was 0.1 or below. That is, better cycle life was obtained.

In the above-mentioned embodiments, as the nonaqueous electrolyte, 1:1(by volume)-mixed solution of propylenecarbonate/dimetoxyethylene to which lithium perchlorate was dissolved at concentration 1 mole/1 was used as the nonaqueous electrolyte. However, nonaqueous electrolyte of the present invention is not limited to the above-mentioned ones, and other nonaqueous electrolyte may be used for the present invention. Examples of usable nonaqueous electrolyte include such liquid nonaqueous electrolyte prepared by dissolving lithium salt such as lithium perchlorate (LiClO₄), lithium fluoroborate (LiBF₄) and lithium hexafluorophosphate (LiPF₆) to a solvent such as carbonate solvent (for example, propylene carbonate, ethylene carbonate), ether solvent (for example, dimetoxyethane, 2-methyletetrahydrofuran), sulfolane, γ-butyrolactone. Further, solid electrolyte, such as Li₂SiO₃ can be used as the nonaqueous electrolyte. When these nonaqueous electrolytes are used too, the battery of the present invention provides the desired effects. When Li-Al alloy or WO₂ intercalated with Li is used as the anode instead of Li, the cathode active material of the present invention showed improved cycle life similarly.

A battery having a long cycle life can be obtained by using the cathode active material in accordance with the present invention. However, when the battery is charged for long time, lithium is excessively pulled out from the cathode active material, thereby inducing deterioration of the cycle life. When the composition of the cathode active material is represented by the expression $Li_xCo_{(1-y)}M_yO_2$, compositional range must be $X \geq 0.25$ at charged state. When the battery is charged to X<0.25 a considerable deterioration of the cycle life is observed.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is

1. A nonaqueous electrolyte secondary battery comprising:
   an anode containing lithium or lithium compound,
   a nonaqueous electrolyte containing lithium compound, and,
   a cathode having a cathode active material represented by expression:

$Li_xCo_{(1-y)}M_yO_2$ wherein X and Y are defined as follows:

$0.85 \leq X \leq 1.3$, $0.05 \leq Y \leq 0.35$, wherein M is a metal of at least one member selected from the group consisting of W, Ta, Ti and Nb.

2. A nonaqueous electrolyte secondary battery in accordance with claim 1, wherein
   said metal M is W.

3. A nonaqueous electrolyte secondary battery in accordance with claim 1, wherein
   said metal M is Ta.

4. A nonaqueous electrolyte secondary battery in accordance with claim 1, wherein
   said metal M is Ti.

5. A nonaqueous electrolyte secondary battery in accordance with claim 1, wherein
said metal M is Nb.

6. A nonaqueous electrolyte secondary battery comprising:
an anode containing lithium or lithium compound,
a nonaqueous electrolyte containing lithium compound, and,
a cathode having a cathode active material represented by expression:

$$Li_XCo_{(1-Y)}W_YO_2$$

wherein X and Y are defined as follows:

$0.85 \leq X \leq 1.3$, $0.1 \leq Y \leq 0.3$, excluding the point of X=1.3, Y=0.3.

7. A nonaqueous electrolyte secondary battery comprising:
an anode containing lithium or lithium compound,
a nonaqueous electrolyte containing lithium compound, and,
a cathode having a cathode active material represented by expression:

$$Li_XCo_{(1-Y)}Ta_YO_2$$

wherein X and Y are defined as follows:

$1.0 \leq X \leq 1.3$, $0.1 \leq Y \leq 0.3$.

8. A nonaqueous electrolyte secondary battery comprising:
an anode containing lithium or lithium compound,
a nonaqueous electrolyte containing lithium compound, and,
a cathode having a cathode active material represented by expression:

$$Li_XCo_{(1-Y)}Ti_YO_2$$

wherein X and Y are defined as follows:

$0.9 \leq X \leq 1.3$, $0.1 \leq Y \leq 0.3$, excluding the range of $0.9 \leq X \leq 1.0$, Y=0.1.

9. A nonaqueous electrolyte secondary battery comprising:
an anode containing lithium or lithium compound,
a nonaqueous electrolyte containing lithium compound, and,
a cathode having a cathode active material represented by expression:

$$Li_XCo_{(1-Y)}Nb_YO_2$$

wherein X and Y are defined as follows:

$0.9 \leq X \leq 1.3$, $0.2 \leq Y \leq 0.3$.

* * * * *